United States Patent
Trzcinski et al.

(10) Patent No.: US 7,057,200 B2
(45) Date of Patent: Jun. 6, 2006

(54) STORAGE PHOSPHOR ERASE

(75) Inventors: Martin E. Trzcinski, Rochester, NY (US); Michael K. Rogers, Mendon, NY (US); David P. Trauernicht, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 121 days.

(21) Appl. No.: 10/625,923

(22) Filed: Jul. 24, 2003

(65) Prior Publication Data

US 2005/0017207 A1 Jan. 27, 2005

(51) Int. Cl.
*G01N 23/04* (2006.01)

(52) U.S. Cl. ..................................... 250/588
(58) Field of Classification Search ............... 250/588, 250/589
See application file for complete search history.

(56) References Cited

U.S. PATENT DOCUMENTS

| | | | |
|---|---|---|---|
| 4,439,682 A | 3/1984 | Matsumoto et al. | |
| 4,496,838 A | 1/1985 | Umemoto et al. | |
| RE31,847 E | 3/1985 | Luckey | |
| 5,065,021 A | 11/1991 | Arakawa | |
| 5,237,177 A | 8/1993 | Kimura | |
| 5,371,377 A | 12/1994 | Struye et al. | |
| 5,422,208 A | 6/1995 | Kojima et al. | |
| 5,550,386 A | 8/1996 | Kojima et al. | |
| 5,665,976 A * | 9/1997 | Arakawa | 250/588 |
| 5,736,746 A | 4/1998 | Furutoh | |
| 6,140,663 A | 10/2000 | Neary et al. | |
| 6,339,225 B1 * | 1/2002 | Funabashi | 250/588 |
| 6,773,160 B1 * | 8/2004 | Evans et al. | 378/173 |
| 2001/0012386 A1 * | 8/2001 | Struye et al. | 382/131 |
| 2002/0070681 A1 * | 6/2002 | Shimizu et al. | 315/246 |
| 2005/0012057 A1 * | 1/2005 | Smith et al. | 250/588 |

FOREIGN PATENT DOCUMENTS

| | | |
|---|---|---|
| EP | 0136588 B1 | 9/1984 |
| EP | 0182095 | 10/1985 |
| JP | 56-181832 | 11/1981 |
| JP | 58-083839 | 11/1981 |
| JP | 59-202099 | 11/1984 |

* cited by examiner

*Primary Examiner*—David Porta
*Assistant Examiner*—Christopher Webb
(74) *Attorney, Agent, or Firm*—William F. Noval

(57) ABSTRACT

A method for erasing noise and a residual image in a storage phosphor, comprising: reading out an exposed storage phosphor which is transported in a first direction by scanning the storage phosphor in a line scan direction perpendicular to the first direction, with a reciprocating stimulating beam of light which causes the storage phosphor to emit light in a first frequency range, the beam of light being suppressed during retrace; erasing the storage phosphor after the reading out with light of a second frequency range and additionally with light of the first frequency range during retrace when the stimulating light beam is supressed.

13 Claims, 2 Drawing Sheets

STORAGE PHOSPHOR ERASE

FIELD OF THE INVENTION

This invention relates in general to computed radiography systems using storage phosphors to record x-ray images and more particularly to a technique for erasing a storage phosphor so that it can be reused.

BACKGROUND OF THE INVENTION

In a storage phosphor computed radiography imaging system as described in U.S. Pat. No. 31,847, reissued Mar. 12, 1985, to Luckey, a storage phosphor, also known as a stimulable phosphor, is exposed to an x-ray image of an object, such as the body part of a patient, to record a latent x-ray image in the storage phosphor. The latent x-ray image is read out by stimulating the storage phosphor with relatively long wavelength stimulating radiation such as red or infrared light produced by a helium neon gas laser or diode laser. Upon stimulation, the storage phosphor releases emitted radiation of an intermediate wave-length, such as blue light, in proportion to the quantity of x-rays that were received. To produce a signal useful in electronic image processing the storage phosphor is scanned in a raster pattern by a laser beam deflected by an oscillating or rotating scanning mirror or hologon. The emitted radiation from the storage phosphor is reflected by a mirror light collector and detected by a photodetector such as a photomultiplier to produce an electronic image signal. Typically the storage phosphor is translated in a page scan direction past the laser beam which is repeatedly deflected in a line scan direction perpendicular to the page scan motion of the storage phosphor to form a scanning raster patter of a matrix of pixels.

The storage phosphor is then erased so that it can be reused again. Successful erasure results in removal of any residual image and any background image noise. Many techniques have been used to erase storage phosphors.

U.S. Pat. No. 4,496,838, issued Jan. 29, 1985, inventors Umemoto et al., discloses a noise erasing apparatus for a stimulable phosphor sheet having an erasing source of light having a wavelength range of 400 nm to 600 nm. The light source can be a fluorescent lamp, a laser source, a sodium lamp, a neon lamp, a metal halide lamp or an Xenon lamp.

U.S. Pat. No. 4,439,682, issued Mar. 27, 1984, inventors Matsumoro et al., discloses a noise erasing method including sequential first and second erasings. The first erasing is conducted to erase the radiation image previously stored in the storage phosphor. The second erasing is carried out just before the phosphor is to be used again, to erase fog which develops after the first erasing.

U.S. Pat. No. 5,065,021, issued Nov. 12, 1991, inventor Arakawa, U.S. Pat. No. 5,422,208, issued Jun. 6, 1995, inventors Kojima et al., and U.S. Pat. No. 5,550,386, issued Aug. 27, 1996, inventors Kojima et al., disclose erasing a stimulable phosphor sheet after image read out, by first exposing the storage phosphor to first erasing light having light of wavelengths within the ultraviolet range and then second exposing the storage phosphor to second erasing light having wavelengths longer than the ultraviolet range.

U.S. Pat. No. 5,665,976, issued Sep. 9, 1997, inventor Arakawa, discloses a storage phosphor erasing method including sequential exposure to a first erasing light which contains no light component of a wavelength range which can be detected by photoelectric readout means, as the storage phosphor is fed away from a read-out section and to a second erasing light which contains a light component in the wavelength range which can be detected by the photoelectric readout means, as the storage phosphor is fed back to the readout section.

U.S. Pat. No. 5,371,377, issued Dec. 6, 1994, inventors Struye et al., discloses a method of storage phosphor erase using light in the wavelength range of 370 nm to 530 nm containing two separate emission bands, one peaking at or near 400 nm (ultraviolet) and the other at or near 500 nm (blue/green).

U.S. Pat. No. 6,140,663, issued Oct. 31, 2000, inventors Neary et al., discloses a storage phosphor erase method using a first radiation source having a wavelength of 577 to 597 nm while preventing ultraviolet light-the source includes a yellow light emitting diode, and a second radiation source having wavelengths including at least one of infrared or near infrared.

EP Patent Publication No. 0 136 588 B1, granted May 15, 1991, inventors Hosoi et al., discloses a storage phosphor erase source includes a light emitting diode emitting light in the wavelength range of 728–850 nm.

See also: EP Patent Publication No. 0 182 095 B1, granted Jan. 4, 1989, inventors Kimura et al., Japanese Patent Provisional Publication Nos. 56 (1981)-11392, 58 (1982)-83839 and 59 (1984)-202099.

Despite the many techniques proposed for erasing a readout storage phosphor, there is a need for an erasure technique that is low in cost, does not use mercury, has long life, compact size, mechanical rigidity and is suitable for erase during scan.

SUMMARY OF THE INVENTION

According to the present invention, there is provided a fulfillment of the need of known erasure techniques.

According to a feature of the present invention, there is provided a method for erasing noise and a residual image in a storage phosphor, comprising:

reading out an exposed storage phosphor which is transported in a first direction by scanning said storage phosphor in a line scan direction perpendicular to said first direction, with a reciprocating stimulating beam of light which causes said storage phosphor to emit light in a first frequency range, said beam of light being suppressed during retrace;

erasing said storage phosphor after said reading out with light of a second frequency range outside of said first frequency range and additionally with light of said first frequency range during retrace when said stimulating light beam is supressed.

ADVANTAGEOUS EFFECT OF THE INVENTION

The invention has the following advantages.

1. The storage phosphor erasure technique is low in cost, compact in size, has long life and is mechanically rigid.
2. The storage phosphor erasure technique does not use mercury.
3. An erasure light wavelength is used which is suitable for erase during scanning.

DETAILED DESCRIPTION OF THE INVENTION

Figure 1:
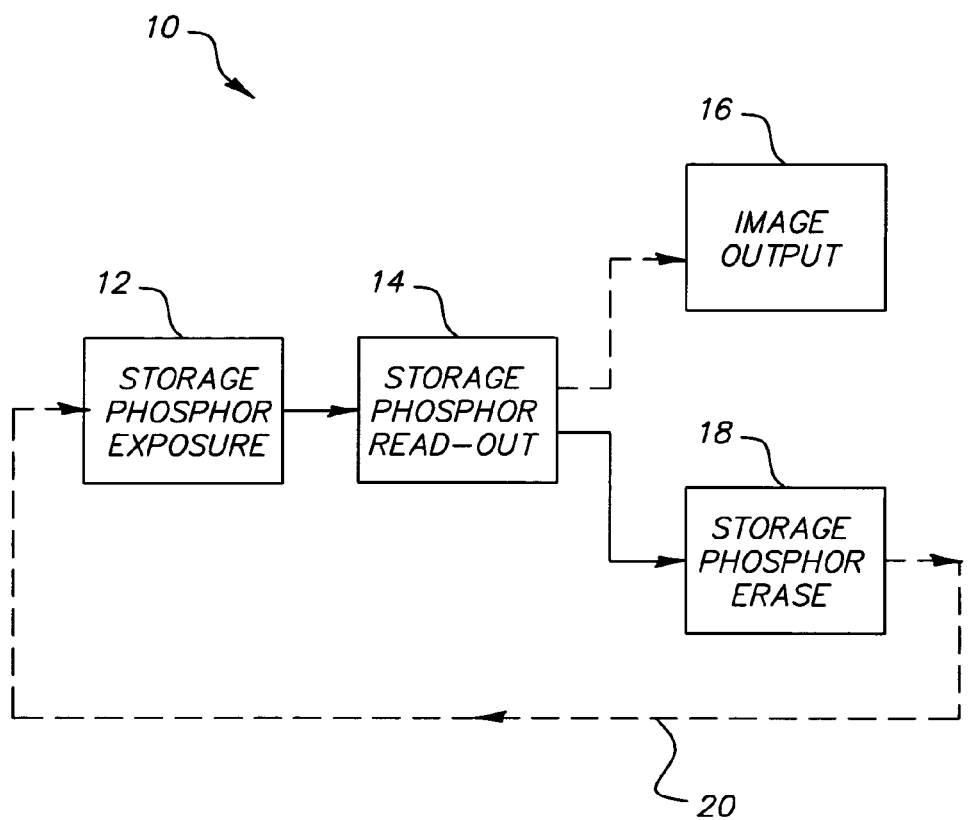
FIG. 1 is a block diagram of a computed radiography system incorporating the present invention.

Referring now to FIG. 1, the present invention relates to a computed radiography imaging system 10 in which a storage phosphor is exposed to an x-ray image of an object, such as an individual's body part (box 12), the stored x-ray image in the storage phosphor is read out in a storage phosphor reader to produce an electronic (digital) x-ray image (box 14), the electronic image is output on a video display or on a hard copy such as, paper or film (box 16). The read out storage phosphor containing noise and/or a latent image is then erased by an erasure assembly (box 18) and the storage phosphor reused (path 20). The storage phosphor can be a rigid or flexible member, usually contained in a cassette. The storage phosphor can also be incorporated into equipment which carries out exposure, read out and erase. Typically, the storage phosphor read-out and erase assemblies are carried out by a storage phosphor reader which extracts a storage phosphor from a cassette, transports the storage phosphor through the read-out and erase assemblies, and then replaces the storage phosphor in the cassette.

Figure 2:
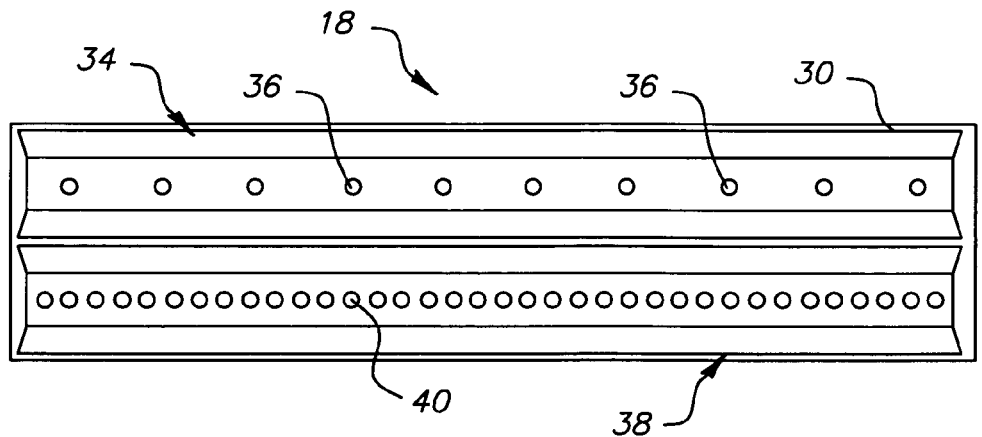
FIG. 2 is a bottom plan view of an embodiment of the present invention.
Figure 3:
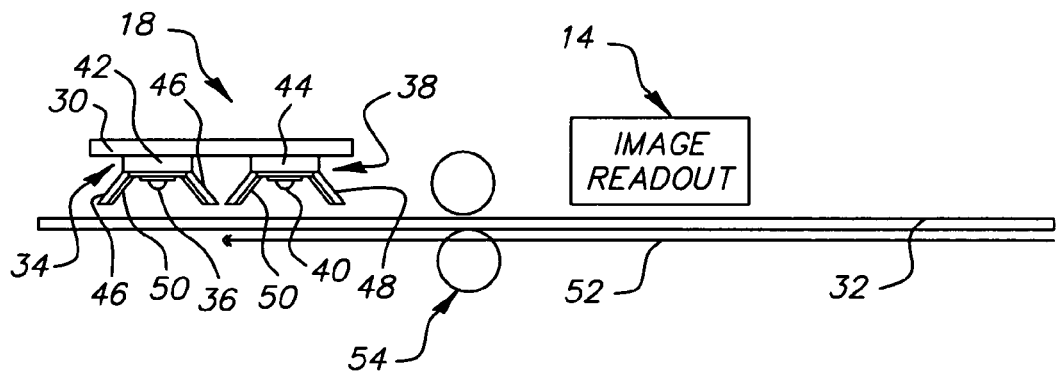
FIG. 3 is a side elevational view of the embodiment of FIG. 2.

According to the present invention there is provided a storage phosphor erase apparatus and method that is low in cost, compact in size, has long life and mechanical rigidity, has no mercury and uses at least one erase wavelength suitable for use during image read out. Referring now to FIGS. 2 and 3 there is shown an embodiment of the present invention. As shown, erase assembly 18 includes a light bar 30 extending the full width or length of a storage phosphor 32 to be erased. Mounted on light bar 30 are a first array 34 of light emitting diodes (LED) 36 (first light source) and a second array 38 of LEDs 40 (second light source). LEDs 36 and 40 are mounted on aluminum heat sinks 42 and 44 which are mounted on light bar 30 which is also made of aluminum and therefore functions as a heat sink. Light deflectors 46 and 48 are preferably covered with high reflectance material 50 (such as 3M ESR (™) reflective film) to direct the light emitted by LEDs 36 and 40 towards storage phosphor 32.

According to the invention, LEDs 36 emit light of a first wavelength(s) or range of wavelengths which is within the range of wavelengths of light emitted by storage phosphor 32 during read out and LEDs 40 emit light of a second wavelength(s) or range of wavelengths which is outside the range of light emitted by storage phosphor 32 during read out. As shown in FIG. 3, storage phosphor 32 is transported in the direction of arrow 52 by drive roller set 54 past image read out assembly 14 and erase assembly 18. Image read-out assembly 14 typically includes a laser scanning assembly including a laser which emits a beam of laser light which is scanned across the width of storage phosphor 32 by a reciprocating mirror driven by a galvo driver.

Figure 4:
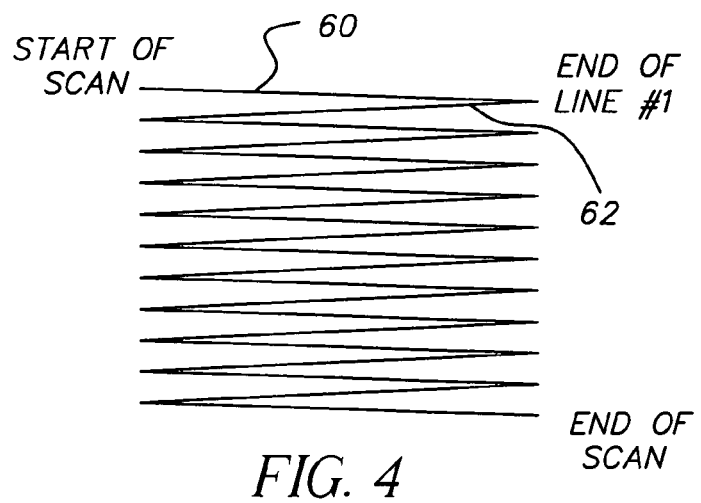
FIG. 4 is a diagrammatic view useful in explaining the present invention.

As shown in FIG. 4, the laser beam is on during scanning (lines 60) and off during retrace (lines 62) when the stimulating laser beam is returned to the start of the next line of scanning.

The laser light stimulates storage phosphor 32 to emit light having the first wavelength which is detected by a photodetector. As an example, light of the first wavelength can be in the blue light range and light of the second wavelength can be in the red or red/orange range.

According to one aspect of the present invention, LEDs 40 are on during the entire scanning process whereas LEDs 36 are on only during retrace of the laser scanner when the laser beam is off and no image is acquired by read-out section 14. Thus, during image acquisition storage phosphor 32 is erased only by light of the second wavelength. While during retrace (non-image acquisition) storage phosphor 32 is erased by light of both the first and second wavelengths.

According to another aspect of the invention, if at the end of image acquisition a latent image still exists, all LEDs are turned on to continue the erase, preferably as storage phosphor 32 is reversed in direction.

The invention has been described in detail with particular reference to certain preferred embodiments thereof, but it will be understood that variations and modifications can be effected within the spirit and scope of the invention.

PARTS LIST 10 computed radiography imaging system
12 storage phosphor exposure
14 storage phosphor image read-out
16 image output
18 storage phosphor erase assembly
20 storage phosphor reused path
30 light bar
32 storage phosphor
34 first array
36 LEDs
40 LEDs
42 aluminum heat sinks
44 aluminum heat sinks
46 light deflectors
48 light deflectors
50 reflectance material
52 direction arrow
54 drive roller set
60 start scanning line
62 end scanning line

What is claimed is:

1. A method for erasing noise and a residual image in a storage phosphor, comprising:

reading out an exposed storage phosphor which is transported in a first direction by scanning said storage phosphor in a line scan direction perpendicular to said first direction, with a stimulating beam of light which causes said storage phosphor to emit light which causes said storage phosphor to emit light in a first frequency range, said beam of light being suppressed during retrace; and erasing said storage phosphor after said reading out with light of a second frequency range and additionally with light of said first frequency range during retrace of said stimulating light beam.

2. The method of claim 1 wherein said first frequency range includes essentially blue light and wherein said second frequency range includes essentially infrared and/or red/orange light.

3. The method of claim 1 including continuing erasing said storage phosphor with light of said first and second frequency ranges after said read out is completed if latent image still exists in the storage phosphor.

4. The method of claim 3 wherein said continuing erasing is carried out as said storage phosphor is transported in a reverse direction to said first direction.

5. Apparatus for erasing noise and a residual image in a storage phosphor comprising:
   a storage phosphor transport for transporting an exposed storage phosphor in a first direction;
   a storage phosphor image read-out assembly including a source of a stimulating light scanning said light beam across said storage phosphor to cause said storage phosphor to emit light in a first frequency range, said light beam being suppressed during retrace; and
   a storage phosphor erase assembly including a first source of light spanning the width of said storage phosphor for emitting erase light in a second frequency range outside of said first frequency range;
   a second source of light spanning said width of said storage phosphor for emitting erase light in said first frequency range;
   such that said first source of light is on all the time but said second source of light is only on during said retrace.

6. The apparatus of claim 5 wherein said first frequency range includes essentially blue light and said second frequency range includes essentially infrared and/or red/orange light.

7. The apparatus of claim 5 wherein said first and second sources of light respectively include arrays of light emitting diodes (LEDs) spanning the width of said storage phosphor.

8. The apparatus of claim 7 wherein said storage phosphor erase assembly further includes highly reflective light deflectors for deflecting light emitted by said LEDs to said storage phosphor.

9. The apparatus of claim 2, wherein said first source of light includes an array of light emitting diodes (LEDs) spanning at least a portion of the width of said storage phosphor.

10. The apparatus of claim 9 wherein said storage phosphor erase assembly further includes highly reflective light deflectors for deflecting light emitted by said LEDs to said storage phosphor.

11. The apparatus of claim 2 wherein said first and second sources of light respectively include arrays of light emitting diodes (LEDs) spanning at least a portion of the width of said storage phosphor.

12. A method for erasing noise and a residual image in a storage phosphor, comprising the steps of:
   providing a stimulating beam of light adapted to cause the storage phosphor to emit light in a first frequency range;
   providing a first erasing source of light emitting the first frequency range, the first erasing source including an array of light emitting diodes (LEDs) spanning at least a portion of the width of the storage phosphor;
   providing a second erasing source of light spanning at least a portion of the width of the storage phosphor, the second erasing source emitting a second frequency range different than the first frequency range;
   reading out an exposed storage phosphor by scanning the storage phosphor with the stimulating beam of light to cause the storage phosphor to emit light in the first frequency range;
   suppressing the stimulating beam of light from causing the storage phosphor to emit light during retrace; and
   erasing the storage phosphor after the reading out with light of the second frequency range, and additionally with light of the first frequency range during retrace of the stimulating light beam.

13. The method of claim 12 further comprising the step of providing a highly reflective light deflector for deflecting light emitted by the LEDs to the storage phosphor.

* * * * *